United States Patent [19]

Bässler

[11] Patent Number: 5,519,291
[45] Date of Patent: May 21, 1996

[54] VACUUM-TUBE PICTURE SCREEN DEVICE WITH A STAND-BY FUNCTION

[75] Inventor: Erwin Bässler, Augsburg, Germany

[73] Assignee: Siemens Nixdorf Informationssysteme Aktiengesellschaft, Paderborn, Germany

[21] Appl. No.: 338,632
[22] PCT Filed: May 14, 1993
[86] PCT No.: PCT/DE93/00425
  § 371 Date: Nov. 22, 1994
  § 102(e) Date: Nov. 22, 1994
[87] PCT Pub. No.: WO93/25044
  PCT Pub. Date: Dec. 9, 1993

[30] Foreign Application Priority Data

May 27, 1992 [DE] Germany ............... 42 17 601.8

[51] Int. Cl.[6] .................................................. H01J 29/70
[52] U.S. Cl. ............................................................ 315/411
[58] Field of Search ............................ 315/411; 348/372, 348/730

Primary Examiner—Theodore M. Blum
Attorney, Agent, or Firm—Hill, Steadman & Simpson

[57] ABSTRACT

In order to reduce power losses and to protect and thus to increase the service life of a vacuum-tube picture screen device with a stand-by function, the heating current (Ih) of the picture tube heater (Hh) is reduced and the deflection device (VA, HA) belonging to the picture tube (BR) and the video amplifier (VV) are switched off. At the same time, the cathode (K) and a predetermined electrode (G2) of the picture tube (BR) are supplied with a predetermined energy. In pauses between applications, a significant power reduction results while the instantaneous-picture function is retained and the risk of cathode poisoning is eliminated.

4 Claims, 1 Drawing Sheet

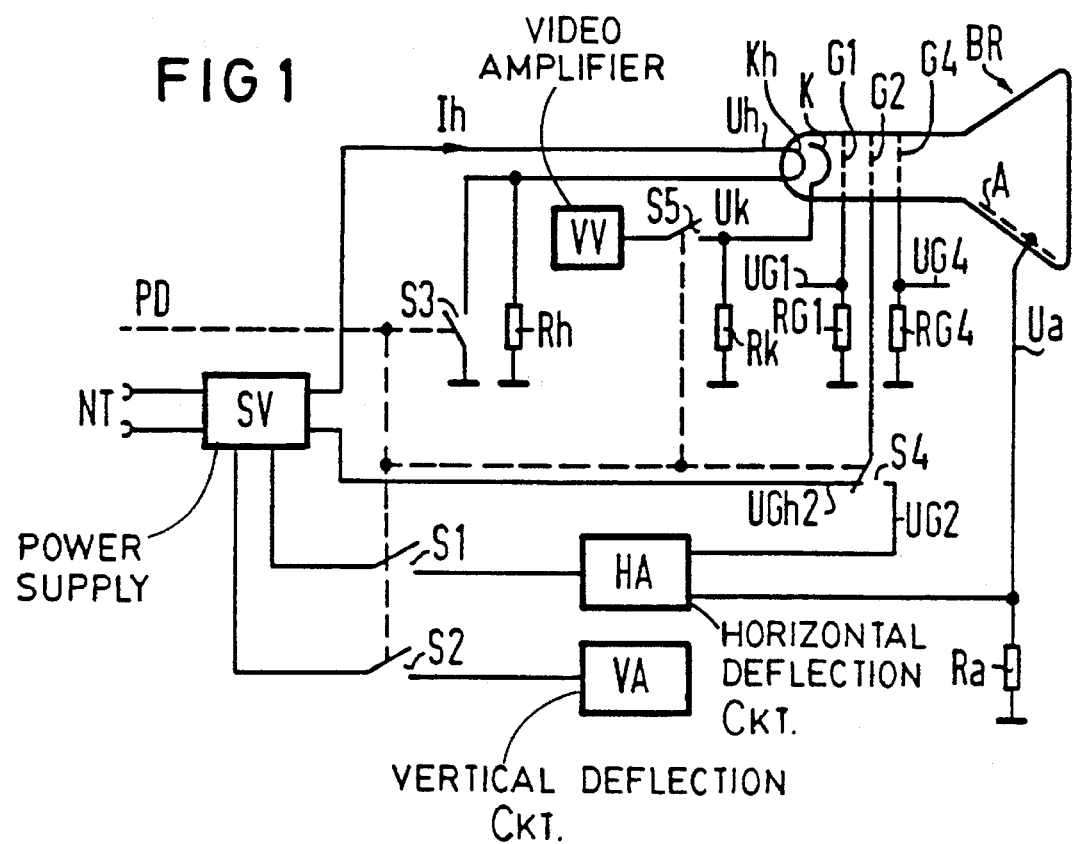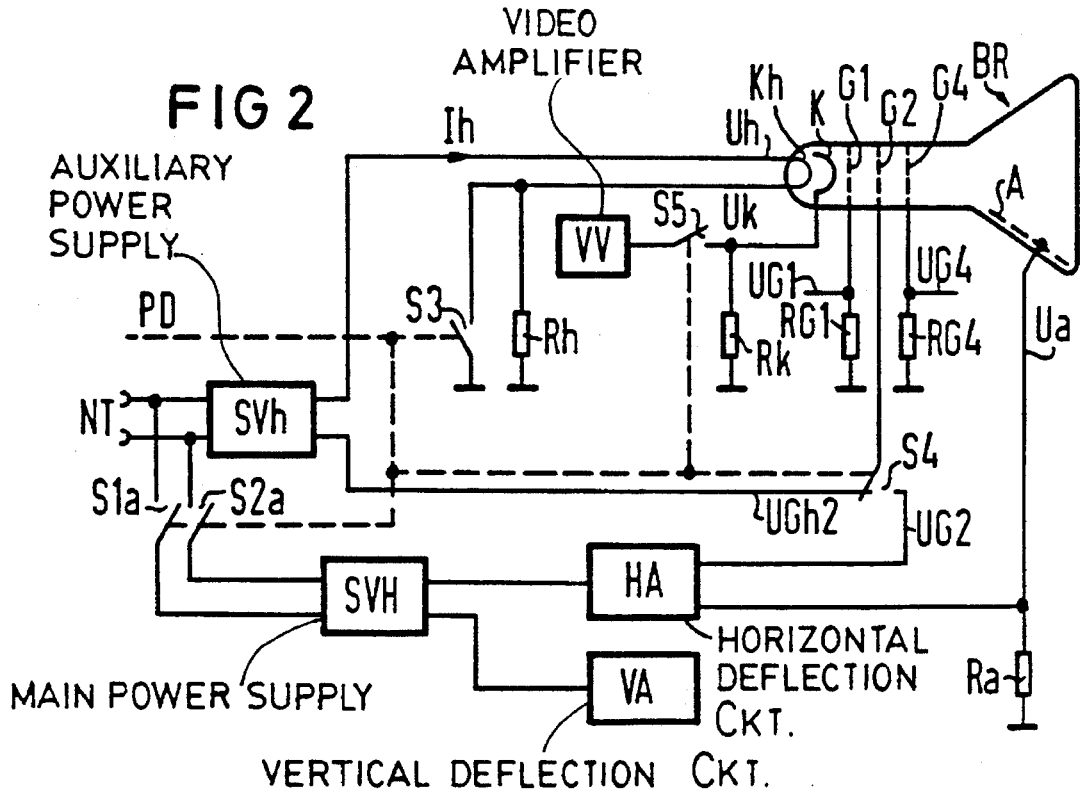

VACUUM-TUBE PICTURE SCREEN DEVICE WITH A STAND-BY FUNCTION

BACKGROUND OF THE INVENTION

1. Field of the Invention

The invention relates to a vacuum-tube picture screen device with a stand-by function according to the preamble of claim 1.

2. Description of the Related Art

In the switched-on state, vacuum-tube picture screen devices such as, for example data display devices, convert energy into waste heat in pauses between applications. Moreover, the end of the service life of the picture tube is rapidly reached with continuous operation and the predictable average fault-free operating time of the deflection device only achieves low values.

In order to avoid these disadvantages, it has previously been proposed to switch off the video signal and to allow the picture tube heater and the deflection device to continue to run as in normal operation. Although this reduces the beam power of the picture tube while still providing an instant-on function, the risk of cathode poisoning remains.

In another implementation, only the picture tube heater is maintained, which results in a significant power reduction while still providing an instant-on function. However, there is the risk of cathode poisoning.

Furthermore, there is the possibility of switching off the line voltage. The power reduction is then 100%. However, the instant-on function is no longer provided. In addition, frequent switching-on and off of the vacuum-tube picture screen device puts the heating cathode at risk.

The possibility is also known of allowing the vacuum-tube picture screen device to continue to run for a predetermined time interval, then to switch off the video signal and also to switch off the line voltage after a further predetermined time interval. The power reduction and the instantaneous-picture function then depend on the application profile. A disadvantageous application profile, however, can again put the heating cathode at risk.

From IBM Technical Disclosure Bulletin, Vol. 34, No. 9, February 1992, Armonk (US), pages 281 to 283, measures for increasing the service life and the fault-tolerance of a vacuum-tube picture screen device are known. The measures include the complete or partial switching off of the vacuum-tube picture screen device whilst completely or partially maintaining the cathode heating. In an additional possible embodiment, it is proposed to apply to one of the grid electrodes a bias voltage which is selected in such a manner that a beam current is stopped. Although these measures contribute to the reduction in the power losses in the stand-by position and thus to the protection of components while providing an instant-on function, they do not prevent cathode poisoning from occurring. This can therefore occur because it has not been assured in any of the cases that an electron cloud which was generated due to the cathode heating and to an indeterminate video signal that continues to pend is drawn off at the cathode.

From published German Patent Applications 36 06 736 A1 and DE 23 22 875 B2, measures for reducing the filament voltage of the picture tube of a vacuum-tube picture screen device in a stand-by mode are known which, however, do not solve the problems in vacuum-tube picture screen devices in stand-by mode as described initially.

From the German Published Application 26 24 965 A1, a switched-mode power supply for a television receiver is known which is especially constructed for generating an auxiliary operating voltage. However, the problems in vacuum-tube picture screen devices in stand-by mode as described initially are not solved by this switched-mode power supply, either.

SUMMARY OF THE INVENTION

It is therefore an object of the invention to provide a vacuum-tube picture screen device with a stand-by control function of the type initially mentioned, which considerably reduces the power consumption in pauses between applications, retains an instantaneous-on picture function and does not have a risk of cathode poisoning.

This and other objects and advantages of the present invention are achieved by the features characterized in a vacuum-tube picture screen device, or cathode ray tube (CRT) device, with a stand-by function which contains a power supply unit, a video amplifier and a picture tube which exhibits an electron beam generating system with a cathode heater, a cathode connected to the video amplifier, a control electrode, an at least first electron acceleration electrode and an anode and to which a vertical and horizontal deflection device belongs, of which the horizontal deflection device is allocated to the control electrode, the at least first electron acceleration electrode and the anode serving as a voltage generator, in the stand-by position of the vacuum-tube screen device, a) the vertical and horizontal deflection device is disconnected from the power supply device and the video amplifier is disconnected from the cathode, b) the cathode heater is connected to a heating current limiter which delivers a heating current which is at least slightly reduced in percentage compared with a predetermined nominal value, and c) the first electron acceleration electrode is connected to an output of the power supply device at which a voltage is present, the magnitude of which is preselected in such a manner that, in connection with a resistor which is referred to ground potential and is connected to the cathode instead of the video amplifier, a current of the magnitude of a picture white value flows from the cathode to the first electron acceleration electrode, which current corresponds to an at least slight percentage proportion compared with a predetermined nominal value.

Accordingly, the heating current for the picture tube heater is reduced and the deflection device responsible for the power consumption and the video amplifier are switched off, in combination. At the same time, the cathode and a predetermined electrode of the picture tube are supplied with a predetermined energy. This results in a significant power reduction in pauses between applications while instant-on function is retained and the risk of cathode poisoning is eliminated.

Although a reduction of the video signal and of the picture tube heating power alone, whilst the deflection device continues to run as in normal operation, does not involve any risk of cathode poisoning while the instant-on function is retained, the power reduction achieved is not as great.

Advantageous developments of the invention provide that the power supply device is implemented as a main and an auxiliary power supply unit, of which the main power supply unit is connected to the vertical and horizontal deflection device and the auxiliary power supply unit is connected at least to the cathode heater of the picture tube, and that, in the stand-by position of the vacuum-tube screen device, the main power supply unit is disconnected from an alternating-current power system and the first electron acceleration electrode is connected to an output of the auxiliary power supply unit at which a voltage is present, the magnitude of which is preselected in such a manner that, in connection with a resistor connected to the cathode, a current of the magnitude of a picture white value flows from the cathode to the first electron acceleration electrode, which current corresponds to an at least slight percentage proportion compared with a predetermined nominal value.

In a further development, the vacuum-tube screen is characterized in that the heating current is reduced by 25% in the stand-by condition of the vacuum-tube picture screen device. Further, the slight percentage proportion of the picture white value is 5% compared with the predetermined nominal value.

BRIEF DESCRIPTION OF THE DRAWINGS

In the text which follows, the invention will be explained in greater detail with reference to the embodiments given in the drawing, in which:

FIG. 1 is a schematic circuit diagram which shows a first exemplary embodiment of a vacuum-tube picture screen device with a stand-by control function according to the invention in a basic representation, and FIG. 2 is a schematic circuit diagram which shows a second exemplary embodiment of a vacuum-tube picture screen device with a stand-by control function according to the invention in a basic representation.

DETAILED DESCRIPTION OF THE PREFERRED EMBODIMENT

The vacuum-tube picture screen devices shown in FIGS. 1 and 2 differ in a power supply device SV (FIG. 1) which comprises a main and an auxiliary power supply unit SVH, SVh in FIG. 2. In FIG. 1, the power supply device SV supplies energy a cathode heater Kh of a picture tube BR and a vertical and horizontal deflection device VA, HA belonging to the picture tube BR. In FIG. 2, the auxiliary power supply unit SVh supplies energy to the cathode heater Kh of the picture tube BR and the main power supply unit SVH supplies energy to the vertical and horizontal deflection device VA, HA belonging to the picture tube BR. The power supply device SV and the main and auxiliary power supply device SVH, SVh obtain their primary energy from an alternating-current power system NT.

In FIG. 1, a first switch S1 disconnects the horizontal deflection device HA and a second switch S2 disconnects the vertical deflection device VA from the power supply device SV. In FIG. 2, the main power supply unit SVH, and thus also the subsequent vertical and horizontal deflection device VA, HA, are disconnected from the alternating-current power system NT via two switches S1a, S2a.

In both figures, the picture tube BR includes the cathode heater Kh already mentioned and, in addition, a cathode K, three grids arranged behind one another and an anode A. The structure and operation of a picture tube is known from the relevant literature which is why it will only be discussed here to the extent which is necessary for establishing the concept embodiment in the present invention. Thus, for example, the first grid can also be thought of as a control electrode G1 and the second and third grid can be thought of as first and second acceleration electrodes G2, G4 for the electrons that are released by a heated cathode K.

The grid voltages UG1, UG2, UG4 for the control electrode G1 and the first and second acceleration electrode G2, G4 and the anode high tension Ua are generated by the horizontal deflection device HA in the embodiments shown in both figures. If the horizontal deflection device HA is de-energized via the switches S1 or S1a, S2a, respectively, the grid voltages UG1, UG2, UG4 and the anode high tension Ua are no longer generated. So that a voltage of 0 volts is then reliably present at the control electrode G1, the second acceleration electrode G4 and the anode A, resistors RG1, RG4, Ra referred to ground are then connected to in each case associated points.

For the first acceleration electrode G2, an auxiliary voltage UGh2, which is generated from the power supply device SV in FIG. 1 and from the auxiliary power supply unit SVh in FIG. 2, is applied instead of the associated voltage UG2 via a change-over switch S4.

In both figures, a video amplifier VV and a bypass resistor Rk referred to ground are connected to the cathode K of the picture tube BR. The video amplifier VV can be disconnected from the cathode K via a further switch S5. As long as the video amplifier VV is switched to the cathode K, a variable video signal Uk is present at the cathode K. If the video amplifier VV is disconnected from the cathode K by the switch S5, the 0 volt voltage is present at the cathode K via the bypass resistor Rk. In this case, the picture tube BR is controlled to fully and constantly display a white screen. The resultant picture white value then corresponds to a nominal value.

The cathode heater Kh, which is supplied with a heating voltage Uh or respectively a heating current Ih via the power supply device SV in FIG. 1 and via the auxiliary power supply unit SVh in FIG. 2, can be influenced in its heating power via a parallel circuit of a switch S3 and a heating current limiter Rh in that the switch S3 short circuits or activates the heating current limiter Rh, depending on its position. The activated heating current limiter Rh is selected in such a manner in this case that it limits the heating current Ih to 75% of its nominal value which is obtained when the heating current limiter Rh is de-activated.

All switches S1 to S5 in FIG. 1 and, respectively, S1a to S5 in FIG. 2, are in each case connected to one another and are controlled via an in each case common control signal PD which switches the respective vacuum-tube screen device in an a so-called power-down state or into a stand-by position.

FIGS. 1 and 2 show the switches in the stand-by position of the vacuum-tube screen device.

The auxiliary voltage UGh2 for the first acceleration electrode G2 exhibits a voltage level which, in the stand-by position of the relevant vacuum-tube screen device, causes a current flow between the cathode K and the first acceleration electrode G2 which, in the present case, generates a picture white value which is 5% compared with the nominal value.

The reduction of the heating voltage Uh of the picture tube BR to 75% of the nominal value and a cathode current of the magnitude of 5% of the cathode current when the picture tube is driven to white in normal operation results in optimum operating mode of the picture tube BR. The auxiliary voltage UGh2 applied to the first acceleration electrode G2 during the stand-by position of the vacuum-tube screen device prevents cathode poisoning by drawing the electron cloud away from the heating cathode Kh and thus increases the average fault-free operating time of the picture tube BR which could otherwise be expected.

Switching off the anode high voltage, the horizontal and vertical deflection VA, HA, the video amplifier VV and reducing the heating voltage Uh considerably reduces the power consumption of the vacuum-tube picture screen device. At the same time, the instantaneous-picture, or instant-on, function is given provided after the deflection circuits VA, HA have been taken into operation and the various grid voltages and the video signal Uk have been applied.

The service life of the vacuum-tube picture screen device is considerably increased.

When an auxiliary power supply unit SVh is used for the heating voltage Uh and the auxiliary voltage UGh2, the power consumption is again reduced in the stand-by mode because the losses of the idling main power supply unit SVH in FIG. 2 or the large power supply device SV in FIG. 1 are reduced.

The basic circuit of the vacuum-tube screen device, shown in FIGS. 1 and 2, is suitable both for black/white picture tubes and for color picture tubes.

Although other modifications and changes may be suggested by those skilled in the art, it is the intention of the inventor to embody within the patent warranted hereon all changes and modifications as reasonably and properly come within the scope of his contribution to the art.

I claim:

1. A vacuum-tube picture screen device with a stand-by function, comprising:

a power supply unit, a video amplifier and a picture tube which includes an electron beam generating system with a cathode heater, a cathode connected to said video amplifier, a control electrode, an at least first electron acceleration electrode and an anode;

vertical and horizontal deflection devices, the horizontal deflection device operating as a voltage generator and being allocated to said control electrode, to said at least first electron acceleration electrode and to said anode to establish voltages therebetween, means for disconnecting said vertical and horizontal deflection devices from said power supply device and for disconnecting said video amplifier from said cathode in said stand-by function, a heating current limiter connected to said cathode heater which delivers in said stand-by function a heating current to said cathode heater which is at least slightly reduced in percentage compared with a current value present when said heating current limiter is not in said stand-by function, and means for connecting said first electron acceleration electrode to an output of said power supply device at which a voltage is present, a magnitude of said voltage at said output of said power supply device being preselected in such a manner that, in association with a resistor which is connected to ground potential and is connected to said cathode and is free of any connection to said video amplifier, a current of a magnitude of a picture white value flows from said cathode to said first electron acceleration electrode, said current from said cathode corresponding to an at least slight percentage proportion compared with a predetermined nominal value of said picture white value.

2. A vacuum-tube picture screen device as claimed in claim 1, wherein said power supply device comprises a main power supply and an auxiliary power supply unit, said main power supply unit being connected to said vertical and horizontal deflection devices and said auxiliary power supply unit being connected at least to said cathode heater of the picture tube, and in the stand-by function of the vacuum-tube picture screen device, said main power supply unit being disconnected from an alternating-current power system and said first electron acceleration electrode being connected to an output of said auxiliary power supply unit at which a voltage is present, a magnitude of said voltage being preselected in such a manner that, in connection with a resistor connected to said cathode, a current of the magnitude of a picture white value flows from said cathode to said first electron acceleration electrode, which current corresponds to an at least slight percentage proportion compared with a predetermined nominal value of said picture white value.

3. A vacuum-tube picture screen device according to claim 1, wherein said heating current limiter reduces the heating current by 25% in the stand-by position of the vacuum-tube screen device.

4. A vacuum-tube picture screen device according to claim 1, wherein said voltage at said output of said power supply is such that said current from said cathode is a slight percentage proportion of the picture white value which is 5% compared with the predetermined nominal value of said picture white value.

* * * * *